United States Patent [19]

Leu et al.

[11] 4,026,875

[45] May 31, 1977

[54] METHOD FOR DEACTIVATING THE CATALYST IN A POLYURETHANE PREPOLYMER

[75] Inventors: Gerhard Leu, Schlieren; Ueli Sulser, Oberengstringen; Jurg Widmer, Zurich; Heinz Goeth, Bulach, all of Switzerland

[73] Assignee: Sika AG, vormals Kaspar Winkler & Co., Zurich, Switzerland

[22] Filed: Apr. 7, 1976

[21] Appl. No.: 674,408

[30] Foreign Application Priority Data

Apr. 15, 1975 Austria .............................. 2846/75

[52] U.S. Cl. .................... 260/77.5 A; 260/45.7 R; 260/77.5 SS
[51] Int. Cl.² ................ C08G 18/82; C08G 18/10; C08K 5/02
[58] Field of Search ............... 260/77.5 SS, 77.5 A, 260/45.7 R

[56] References Cited

UNITED STATES PATENTS

| 2,692,873 | 10/1954 | Langerak et al. | 260/77.5 SS |
| 2,817,643 | 12/1957 | Altner | 260/77.5 A |
| 3,479,325 | 11/1969 | Blomeyer et al. | 260/77.5 AA |
| 3,497,457 | 2/1970 | Hurlock et al. | 260/77.5 SS |
| 3,660,341 | 5/1972 | Dinbergs | 260/77.5 SS |

OTHER PUBLICATIONS

Hackh's Chemical Dictionary, 4th Edition, McGraw-Hill, New York, (1969) p. 667.

*Primary Examiner*—H.S. Cockeram
*Attorney, Agent, or Firm*—Gordon W. Hueschen

[57] ABSTRACT

A method of manufacturing polyurethane prepolymers containing free, reactive end groups of polyisocyanate and compounds with active H-atoms, while using a tertiary amine as the catalyst, and thereafter deactivating the catalyst by reacting with an alkyl halide.

5 Claims, No Drawings

METHOD FOR DEACTIVATING THE CATALYST IN A POLYURETHANE PREPOLYMER

BACKGROUND OF THE INVENTION

The present invention relates to a new and improved method for the catalytic manufacture of polyurethane prepolymers.

During the industrial fabrication of polyurethane prepolymers from polyisocyanates and compounds with active H-atoms, such as for instance polyols, controlling the reaction speed is problematic.

According to a known method the reaction speed is shortened in that, for instance, a diisocyanate-polyol mixture of the desired composition is heated between 110° to 120° C and maintained for such length of time at this temperature until the polyurethane prepolymer possesses the desired NCO-value or until there have been consumed all of the isocyanate groups.

As a general rule the shortening of the reaction time which is obtained according to this process does not reach the economically desired degree. The high temperatures required for a technologically interesting shortening of the reaction time bring about undesired side reactions which result in that the desired end values of the repolymers, such as for instance viscosity, storage stability or NCO-value in the case of prepolymers, for instance with terminal NCO-groups, fluctuate in an uncontrolled manner over a wide range.

According to another known process catalysts or mixtures of catalysts can be employed for the shortening of the reaction time for the reaction of polyisocyanates with compounds having active H-atoms.

Known catalysts are, for instance, organometallic compounds, metal halides, acids, bases or tertiary amines. The publication of, for instance, J. H. Saunders and K. C. Frisch in "Polyurethanes", Chemistry and Technology, Part I, pages 129–217, Interscience, New York, 1965, provides a good insight into known catalysts.

The use of catalysts during the manufacture of polyurethane prepolymers has the advantage, in contrast to the first mentioned technique, that the reaction for instance of a diisocyanate with for instance a polyol can occur with only slightly elevated temperatures, so that for the most part undesired side-reactions brought about by high reaction temperatures are suppressed.

The use of catalysts during the production of polyurethane prepolymers is however problematic inasmuch as following interruption of the reaction process they further remain active and, for instance, in the case of NCO-terminated prepolymers cause intermolecular reactions. Consequently, the storage stability or self-life of such type prepolymers can be reduced that they are not capable of being stored or can no longer be processed even after a very short period of time. A further drawback of this method resides in the fact that the active catalysts contained in the prepolymer also can be active in the products which are produced with such prepolymer without it being possible to control such activity to a desired degree. The problem of inactivating catalysts has not yet been solved. It has indeed been proposed, for instance, to neutralize basic catalysts with acid chlorides, such as p-nitrobenzyl chloride (W. Cooper, R. W. Pearson, S. Drake, Ind. Chemist 36, 121 (1960)). The reaction products of such neutralization or the acids released during neutralization however can in turn again function as catalysts, so that prepolymers treated in this manner in toto do not exhibit the strived for improvements, for instance storage stability.

DESCRIPTION OF THE INVENTION

It has now been found that 1,4-diazabicyclo[2.2.2]octane (Dabco, triethylenediamine), which as is known is a very active catalyst with wide applicability for isocyanate reactions, can be reacted with halogenated ethane derivatives, preferably with tetrabromo ethane into a thermally stable compound which is insoluble in a polyurethane prepolymer and itself does not possess any catalytic activity to isocyanate reactions.

The product of the reaction between Dabco and tetrabromo ethane constitutes a colorless and crystalline compound which itself decomposes above about 360° C.

Based upon n.m.r. (nuclear magnetic resonance) spectroscopic data (singlet at 4.80 ppm (2H); singlet at 3.20 ppm (12H)) and analytical tests, with this compound one is dealing with a 1:1-complex of Dabco and tetrabromo ethane. Such type complexes have previously been found in a different connection, for instance in hexamethyleneteramine and iodoform (T. Dahl, O Hassel, Acta Chem. Scand. 22, 2036 (1968)), whereas regarding Daboc there has only become known a complex with a tetrahalomethane, namely carbon tetrabromide (J. P. Lorand, Tetrahedron Let. 27, 2511 (1971)).

The formation of the Dabco tetrabromo ethane complex, which no longer possesses any catalytic activity for isocyanate reactions, occurs in the manner that, for instance, a diisocyanate-polyol-Dabco-mixture heated to a predetermined temperature has added thereto a calculated quantity of tetrabromo ethane, and thereafter in a very short time there is formed the described 1:1 complex and precipitates either immediately or after a very short time.

This method renders it possible to employ a very active catalyst having wide field of applicability, namely Dabco, for the production of polyurethane prepolymers and within a desired period of time, for instance upon reaching a certain NCO-value, to deactivate such with tetrabromo ethane. The shortening of the reaction time of, for instance, a diisocyanate-polyol mixture can be controlled by means of the reaction temperature and by means of the Dabco concentration. Since the 1:1 complex formed during the deactivation of Dabco forms immediately after the addition of tetrabromo ethane, the isocyanate-polyol-reaction can be stopped within the shortest time.

The complex which is difficult to dissolve in the reaction mixture can be removed from the prepolymer for instance by filtration. The crystallite also can be left in the prepolymer, and it does not settle even after longer standing times.

The catalytic action of Dabco is increased if, for instance, the diisocyanate-polyol mixture is free of water i.e. anhydrous. This can be achieved by employing a suitable dehydrating agent, for instance a silane, a monoisocyanate, an alcoholate or other known dehydrating agents. During the production of polyurethane prepolymers with reactive end or terminal groups relative to the NH-groups, for instance NCO-groups, there is additionally obtained an improved storage stability if the formation of the urea groups is suppressed as much as possible.

The following examples will serve to further explain the invention:

EXAMPLE 1

In a reaction vessel there is heated to 120° C a mixture of 300 gms. of polyether glycol, 180 gms. of propylene glycol and 54 gms tolyldiisocyanate (TDI) in the presence of nitrogen and the mixture is agitated for such length of time until the NCO-value of the prepolymer (prepolymer 1) has reached the value 1.57%. The reaction duration: 120 minutes.

EXAMPLE 2

There is heated to 50° C within 10 minutes in a reaction vessel a mixture of 300 gms. polyether glycol (Example 1) and 180 gms. polypropylene glycol (Example 1) with 1.65 gms. tolylsulfonylisocyanate. Thereafter there is added a solution of 0.6 gms. Dabco in 2 gms. acetone and stirred for 5 minutes. While continuously stirring there is added at one time 54 gms. TDI. The reaction temperature climbs to 80° within about 10 minutes. The mixture is maintained at this temperature while stirring for such length of time until the NCO-value of the prepolymer (prepolymer 2) has reached the value 1.57, then there is added 1.86 gms. tetrabromo ethane and for a short time thereafter stirring or agitation is continued. The reaction time: 90 minutes.

EXAMPLE 3

There is produced a prepolymer (prepolymer 3) according to Example 2, wherein the polyol mixture however is not dried with monoisocyanate. All other conditions are the same.

EXAMPLE 4

The prepolymers 1, 2 and 3 are stored at 60° C in tightly sealed pistons and periodically there is measured the viscosity of the samples (employed instrument "Rheomat 15", available from Contraves AG, Zurich, Switzerland.

TABLE 1

| Storage | Viscosity [CP] | | |
|---|---|---|---|
| [Days] | Prepolymer 1 | Prepolymer 2 | Prepolymer 3 |
| 0 | 14250 | 7200 | 10000 |
| 1 | 16600 | 8050 | 13000 |
| 2 | 20200 | 9700 | 15600 |
| 3 | 24100 | 10700 | 18000 |
| 4 | 27300 | 11700 | 19800 |
| 5 | 30500 | 12200 | 21200 |
| 6 | 34000 | 12900 | 22100 |
| 7 | 37000 | 13600 | 23000 |
| 8 | 39800 | 14100 | 24300 |
| 9 | 44000 | 14300 | 25500 |
| 10 | 48000 | 14400 | 26600 |
| 15 | 70000 | 15500 | 28200 |

EXAMPLE 5

A mixture consisting of 1100 gms. of polyethylene glycol, 1000 gms. of a polypropylene glycol and 247.5 gms. of tolyldiisocyanate is heated to 50 ° C while stirred or agitated and mixed with a solution of 1.5 gms. Dabco in 5 ml. acetone. Then heating proceeds to 80° C and agitation of the mixture carried out for such length of time until the prepolymer has an NCO-value of 1.8%. The reaction duration: 50 minutes.

EXAMPLE 6

A respective 200 gms. of the prepolymer of Example 5 is admixed with 466 mg. tetrabromo ethane (sample 1), 450 mg. tetrabromo ethane (sample 2) and 228 mg. dibromo propane (sample 3) and stored in a closed vessel for 7 days at 60° C. From these samples the viscosity was periodically measured and compared with those of a sample without additives (sample O):

TABLE 2

| | Viscosity Course of Prepolymers | | | |
|---|---|---|---|---|
| | Viscosity in CP | | | |
| Days | 0 | 1 | 2 | 3 |
| 0 | 8000 | 8000 | 8000 | 8000 |
| 1 | 13000 | 11200 | 13200 | 13200 |
| 2 | 13600 | 11600 | 13800 | 14000 |
| 7 | 20000 | 14500 | 19800 | 15400 |
| 30 | 48000 | 17200 | 41500 | 22300 |

While there are shown and described present preferred embodiments of the invention, it is to be distinctly understood that the invention is not limited thereto, but may be otherwise variously embodied and practiced within the scope of the following claims.

Accordingly, what is claimed is:

1. In a method for manufacturing polyurethane prepolymers with free, reactive end groups prepared from polyisocyanates and compounds with active H-atoms in the presence of a tertiary amine as the catalyst, which prepolymers without further treatment tend to increase in viscosity on aging, the improvement comprising deactivating the catalyst by mixing an effective amount of tetrabromo ethane with the prepolymer, whereby the tendency of the prepolymer to increase in viscosity on aging is substantially reduced.

2. The method as defined in claim 1, wherein the catalyst is an aliphatic tertiary amine.

3. The method as defined in claim 1, wherein the catalyst is a cycloaliphatic tertiary amine.

4. The method as defined in claim 1, wherein the catalyst is 1,4-diazobicyclo [2.2.2] octane.

5. The method as defined in claim 1, wherein the prepolymer is prepared in the presence of a dehydrating agent.

* * * * *